United States Patent [19]

Nakata

[11] Patent Number: 4,943,894

[45] Date of Patent: Jul. 24, 1990

[54] PROJECTOR-TYPE HEAD LAMP FOR VEHICLES

[75] Inventor: Yutaka Nakata, Isehara, Japan

[73] Assignee: Ichikoh Industries, Ltd., Tokyo, Japan

[21] Appl. No.: 365,574

[22] Filed: Jun. 14, 1989

[30] Foreign Application Priority Data

Jun. 14, 1988 [JP] Japan ................................ 63-144676

[51] Int. Cl.$^5$ ................................................ B60Q 1/00

[52] U.S. Cl. ....................................... 362/61; 362/303; 362/305; 362/308; 362/328; 362/346

[58] Field of Search ................. 362/61, 303, 305, 308, 362/328, 346, 348

[56] References Cited

U.S. PATENT DOCUMENTS

| | | | |
|---|---|---|---|
| 4,772,987 | 9/1988 | Kretschmer | 362/61 |
| 4,800,467 | 1/1989 | Lindae | 362/303 |
| 4,825,343 | 4/1989 | Nakata | 362/61 |

*Primary Examiner*—Douglas Hart
*Attorney, Agent, or Firm*—Foley & Lardner, Schwartz, Jeffery, Schwaab, Mack, Blumenthal & Evans

[57] ABSTRACT

The projector-type head lamp for vehicles comprises a reflector having an optical axis, a lamp bulb operable as a light source, having a filament horizontally disposed in a direction perpendicular to the optical axis, and a convex lens disposed in an area defined by the light beam shaped by the rays of light reflected by the reflector and having an optical axis nearly coincident with the optical axis of the reflector. The inner reflecting surface of the reflector has a main reflecting area including a part of a spheroid having the first focus near the center of the filament as light source and the second focus near the center of the cut-off edge, at least parts of the main reflecting area located above or below the horizontal plane in which the optical axis lies and which define multiple largely slanted filament images on the screen being formed as sub reflecting areas having such reflecting characteristics as to shift the filament images horizontally. This projector-type head lamp provides a horizontally elongated light distribution pattern of which the profile line is nearly horizontal on the side nearest the vehicle and which contributes to the effective illumination.

7 Claims, 10 Drawing Sheets

PROJECTOR-TYPE HEAD LAMP FOR VEHICLES

BACKGROUND OF THE INVENTION (a) Field of the Invention

The present invention relates to a so-called projector-type head lamp, and more particularly to a projector-type head lamp for vehicles having improved light distribution characteristics.

(b) Description of the Prior Art

The projector-type head lamp for vehicles is required for a light distribution pattern which brightly illuminates the road surface in front of the car without dazzling the driver of a car running on the opposite lane when passing each other. As a head lamp having a light distribution pattern meeting such requirements and of which the lens configuration is simple and the entire shape can be made small, so-called projector-type head lamps have been proposed. A typical one of such projector-type head lamps comprises a lamp bulb, operable as a light source, having a filament, a reflector partially having an elliptic reflecting surface which has a first focus near the light source and a second focus in front of the light source, a shade located near the second focus of the reflector, and a convex lens so formed as to have its focus near the second focus of the reflector and to transmit in the direction of radial optical axis the rays of light emitted from the light source, reflected by the reflector and shaped by the shade. In the projector-type head lamp having an elliptic reflecting surface in a part of the inner reflecting surface as described above, the filament, as the light source, takes the form of an, elongated cylinder in practice, and can be disposed either parallel to the direction of the optical axis of the reflector or perpendicularly to the optical axis. Since the light distribution pattern should preferably be wider horizontally than vertically, the filament is disposed horizontally in a direction perpendicular to the optical axis of the reflector. The illuminated areas defined when the road surface is illuminated by such a projector-type head lamp is schematically shown as areas, each of which is enclosed with a closed curved line in FIG. 1 (FIG. 1 shows the keep-to-the-left traffic system). In FIG. 1, the reference numeral 11 indicates the shoulder of the subject car's lane, 12 the shoulder of the opposite lane, 13 a center line, and 14 the course of the subject car. The optical axis of the reflector of the head lamp is generally directed to the subject car's course. The three closed curved lines 15a, 15b and 15c each form each an isolux line; the area enclosed by the curved line 15a is a central area in which the illuminance is very high (hot zone); and the curved line 15c diagramatically shows a profile of the illuminated area. In a light distribution pattern formed by a conventional reflector partially having an elliptic reflecting surface, namely, an illuminated area, the lower center of the profile line 15c is indented in the direction of the driving course of the car as indicated by the reference numeral 16, so that the illumination thus obtained is not satisfactory.

The reason why such an indentation or dark area develops will be explained below with reference to FIGS. 2 to 4. Each point of the reflector can be approximated by a flat small mirror, but since each point of the reflector is contributed to the production of the filament image on the screen, the total illuminance obtained with the head lamp is considered to be due to the total superposition of individual filament images from all the points of the reflector. For example, FIGS. 2 (A1), (B1) and (C1) show the positions of the typical points l, m and n, respectively, on the reflector having a spheroidal reflecting surface, FIGS. 2 (A2), (B2) and (C2) show the filament images l', m' and n', respectively, reflected by the typical points l, m and n onto the screen, and FIGS. (A3), (B3) and (C3) show the positions of the typical points l, m and n as well as the shapes l'', m'' and n'' of the filament images l', m' and n' reflected by the typical points l, m and n onto the screen. The filament images at the points on the reflector (except for the area near the apex in which the opening for fixation of the lamp bulb is to be installed because this area does work a reflector) vary in orientation and shape from one point to another as shown in FIG. 3. As seen from FIG. 3, the filament images are generally elongated and horizontal in the longitudinal reflecting area of the reflector crossing the vertical plane in which the optical axis lies, and, as they move apart from the optical axis, become smaller horizontal images. In the lateral reflecting area of the reflector crossing the horizontal plane in which the optical axis lies, the filament images are small horizontal images which become increasingly more contracted horizontally as their distance from the optical axis increases. Also it will be seen from FIG. 3 that in the reflecting area defined by the line of intersection between the reflecting surface and the horizontal plane in which the optical axis lies and the line of intersection between the reflecting surface and the vertical plane in which the optical axis lies, namely, in the upper and lower right and left areas, the filament images are oblique As the filament images reflected at the points on the reflector shown in FIG. 3 are superposed on each other, the area enclosed with a dash line in FIG. 4 generally defines the profile of the superposed images. The cause of the aforementioned indentation is that the filament images in the left and right areas 20A and 20B below the optical axis of the reflector as viewed from the light source as shown in FIG. 3 and in the left and right areas 21A and 21B above the optical axis of the reflector are greatly slanted. These areas are shown as generally square ones defined as enclosed with a dot-dash line for the simplicity of explanation. FIG. 4 schematically show an enlarged scale of the filament images reflected at eight typical points in the left and right areas 20A and 20B below the optical axis of the reflector as viewed from the light source. As seen, indentatations develop at two places indicated with the reference numerals 22A and 22B. Actually, the indentation or dark area 22B has no problem since it can be cut off by the shade disposed between the reflector and convex lens and also it is located beyond the illuminated area. However, the indentation 22A is problematic because it takes place at the side of the illuminated area nearest the vehicle and it does not contribute to the effective illumination. The illuminated area or the profile line thereof should preferably have the shape of the area enclosed with the dot-dash line as shown in FIG. 1. The illuminated area should desirably have a pattern with the side nearest the vehicle being nearly horizontal and not indented, as shown with the reference numeral 15d.

SUMMARY OF THE INVENTION

The object of the present invention is to overcome the above-mentioned drawbacks of the conventional projector-type head lamps for vehicles partially having a spheroidal reflecting surface by providing a projector-type head lamp which has formed, in at least parts of a spheroidal reflecting area, contributed to production of large slanted filament images specially designed reflecting areas having such reflecting characteristics as to shift the filament images horizontally and to provide a horizontally elongated light distribution pattern of which the profile line is nearly horizontal on the side nearest the vehicle and which contributes to the effective illumination.

The present invention has as another object to provide a projector-type head lamp for vehicles which has formed, in at least parts of a spheroidal reflecting area contributed to production of large slanted filament images, sub reflecting areas in which multiple fine reflecting elements differently orientated are smoothly joined to each other, the orientations of these fine reflecting surface elements being so determined that the rays of light incident upon them from the light source converge upon the light-converged areas in the horizontal plane in which the other focus of the spheroid lies and also the optical axis substantially lies.

These and other objects and advantages of the present invention will be better understood from the following description made, by way of example, of the embodiment of the present invention with reference to the drawings

BRIEF DESCRIPTION OF THE DRAWINGS

FIGS. 2 (A1), (B1) and (C1) show the positions of the typical points l, m and n on the reflecting surface, FIGS. 2 (A2, (B2) and (C2) show the outlines, respectively, of the reflected images l', m' and n' of the filament reflected at typical points 1, m and n, respectively, and projected on the screen; and FIGS. 2 (A3), (B3) and (C3) are the conceptual diagrams showing the formation of the reflected images l', m' and n' of the filament at the center of the screen by the light rays reflected from the typical points l, m and n on the prior art reflection surface, in which the symbols l'', m'' and n'' indicating both the typical points l, m and n and the reflected images l', m' and n' of the filament;

FIGS. 5 to 13 show one embodiment of the projector-type head lamp for vehicles according to the present invention, of which:

FIG. 5 is a side elevation schematically showing the structure of the projector-type head lamp;

FIG. 6 is a plan view of the projector-type head lamp;

FIG. 7 is a front view of the projector-type head lamp;

FIG. 8 is a schematic front view of the reflector with two sub reflecting areas having special reflecting characteristics;

FIG. 9 is a schematic diagram of the reflector of which the lower half is shown as enlarged in scale for the purpose of explaining the arrangement of multiple fine reflecting surface element groups forming the sub reflecting areas shown in FIG. 8;

FIG. 10 is an explanatory drawing of the optical characteristics of the reflector of the protector-type head lamp according to the present invention;

FIGS. 11 (A) and (B) are schematic diagrams, respectively, for explanation of the multiple filament images formed on the shade by the rays of light reflected in the reflecting areas 42A and 42B, the filament images being shifted horizontally;

FIG. 12 is a schematic diagram of the profile of the entire images derived from the superposition of multiple filament images formed by rays of light reflected at the reflecting areas 42A and 42B;

FIG. 13 is a schematic diagram showing the isolux line of light distribution pattern;

DETAILED DESCRIPTION OF THE PREFERRED EMBODIMENT

One embodiment of the projector-type head lamp according to the present invention will be described with reference to the drawings.

Figure 1:
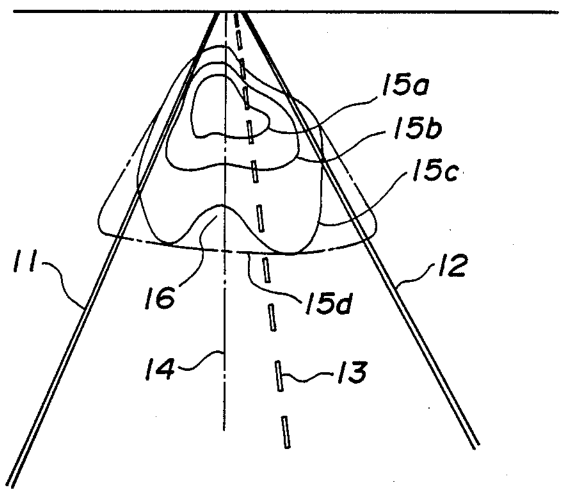
FIG. 1 is a schematic drawing for explanation of the problems of the pattern of an illumination of the road surface by the light from a conventional projector-type head lamp having a spheroidal inner reflecting surface.
Figure 4:
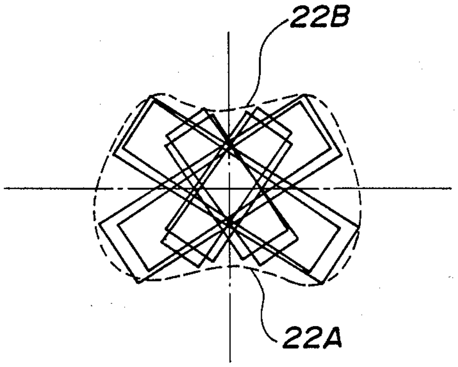
FIG. 4 is a schematic view outlining a pattern resulted from the superposition of the reflected images from the plural typical points shown in FIG. 3, in which the largely slanted reflected filament images formed by the typical points in the reflecting areas 20A and 20B shown in FIG. 3 are indicated with solid lines.
Figure 2:
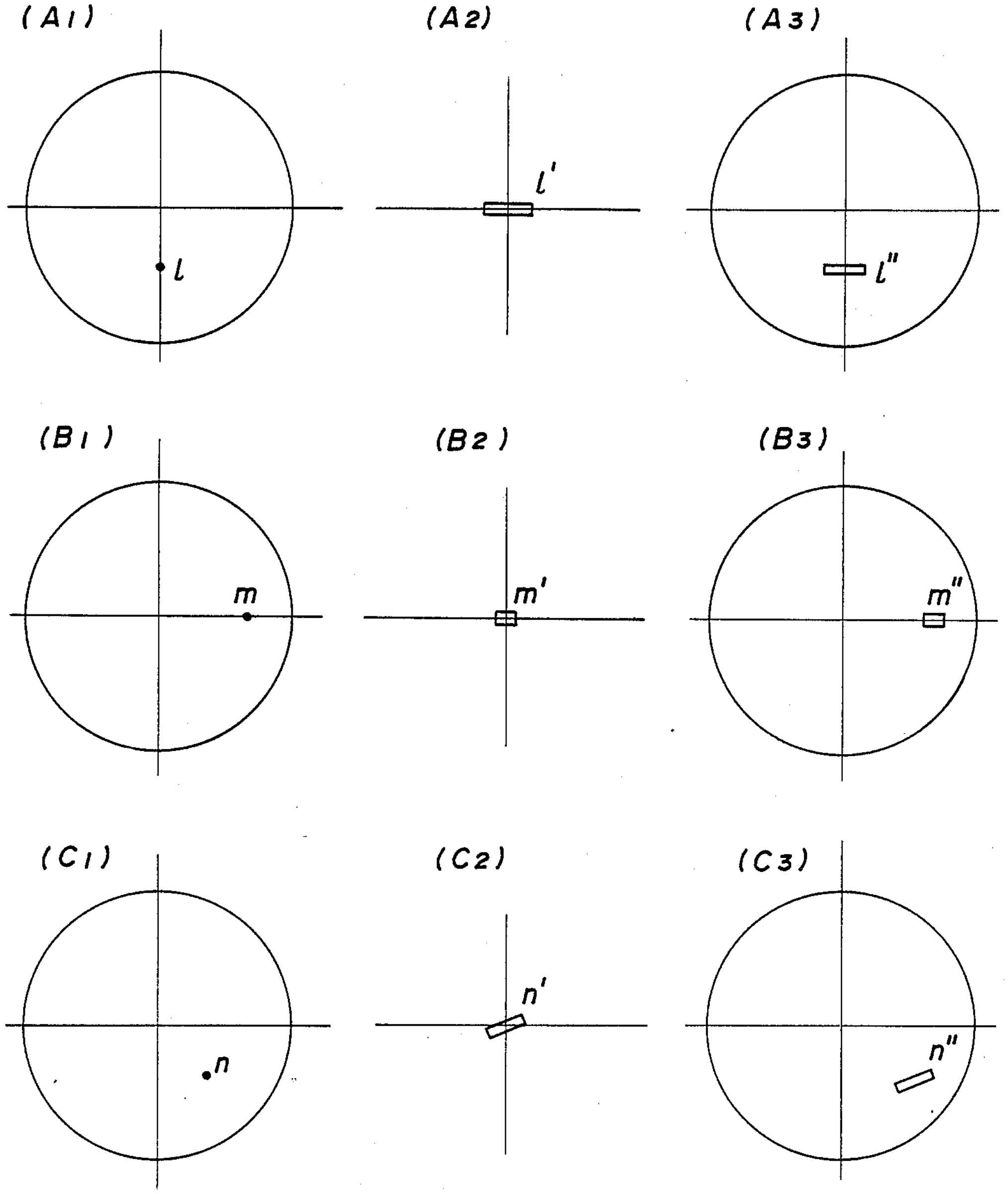
FIGS. 2 (A1) to (C3) are simple explanatory drawings of the reflected image of the filament reflected at a typical point in case each point of the prior art reflecting surface is formed like an extremely small plane mirror.
Figure 3:
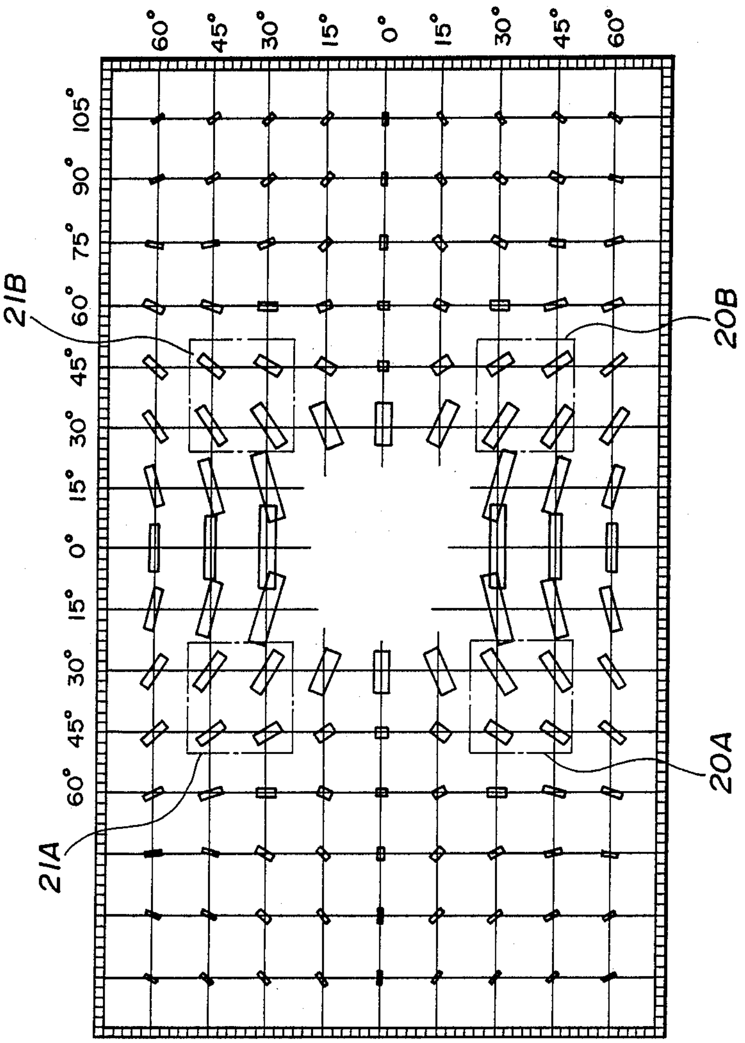
FIG. 3 is a conceptual diagram schematically showing the reflected images from plural typical points on the prior art spheroidal inner reflecting surface.
Figure 5:
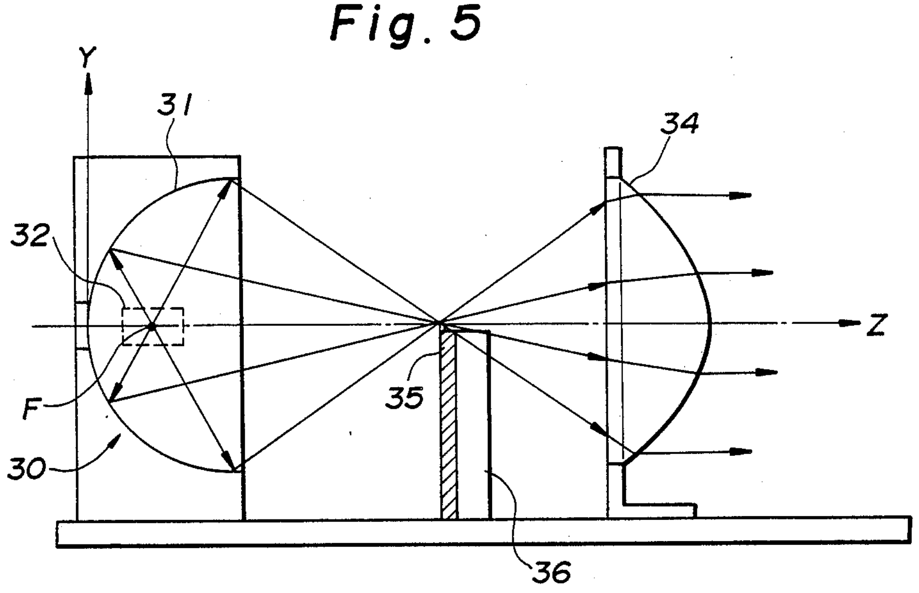
Figure 6:
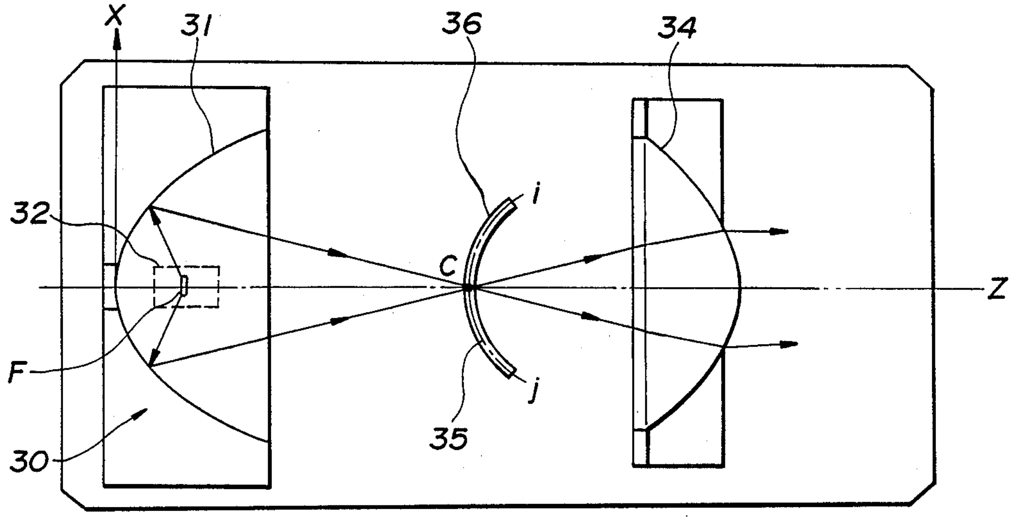
Figure 7:
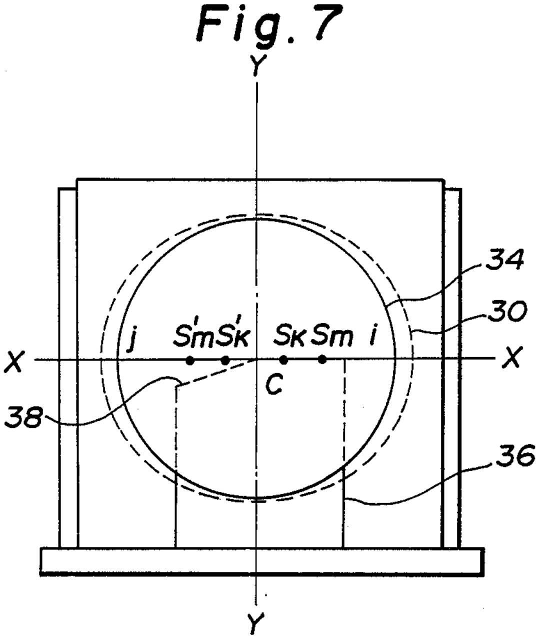

Referring, now to FIG. 5, the projector-type head lamp according to the present invention has a reflector 30 consisting of an inner reflecting surface 31 having a main reflecting area 40 and two sub reflecting areas 42A and 42B formed in parts of the main reflecting area 40 as will be described later. The reflector 30 has the center axis on the Z axis, and there is disposed in front of the reflector 30 a convex lens 34 of which the optical axis is aligned with the center axis of the reflector 30. The reference numeral 32 indicates a lamp bulb containing a filament F and which is a halogen lamp, for example. The center, of the filament F is arranged on the X axis so as to be nearly coincident with the first focus of the spheroid forming the main reflecting area 40, and also the filament F is arranged so as to be parallel to the X axis and perpendicular to the Z axis as shown in FIG. 6. There is disposed between the reflector 30 and the convex lens 34 a shade 36 having at the top thereof a cut-off edge 35 of which the center C is disposed nearly coincident with the second focus of the spheroid forming the main reflecting area 40 and is in contact with the meridional image surface i-j of the convex lens 34. Thus, the cut-off edge 35 cuts off the light beam emitted from a light source 32 and reflected by the reflector 30 to shape it into a light distribution pattern suitable for the road surface illumination of the automobiles.

Figure 8:
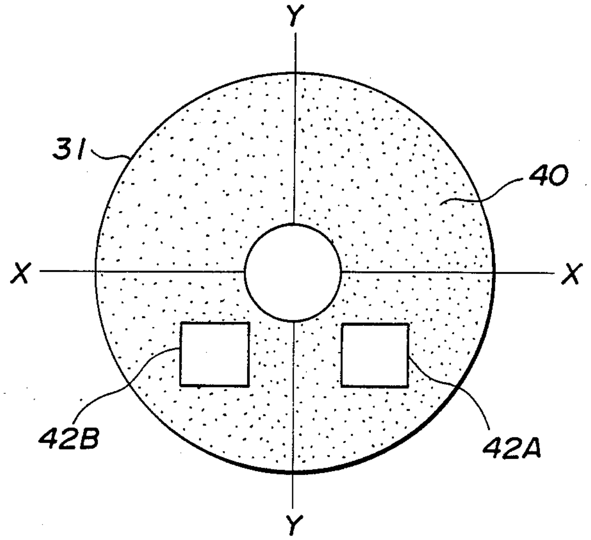

The positional relation between the main reflecting surface 40 (indicated with multiple fine dots) and sub reflecting areas 42A and 42B forming together the inner reflecting surface 31 of the reflector 30 is schematically shown in FIG. 8. In this embodiment, the main reflector area 40 is formed as a spheroidal reflecting surface, while the sub reflecting areas 42A and 42B are formed as substantially square reflecting areas, respectively, symmetrical to each other with respect to a vertical plane in which the optical axis lies within quad reflecting areas 43A and 43B (which areas will be referred to as "first and second reflecting areas" hereinafter), respectively, located below the horizontal plane in which the optical axis lies and symmetrical to each other with respect to the vertical plane in which the optical axis lies. These sub reflecting areas 42A and 42B generally correspond in position to parts of the spheroidal reflecting surface which form on a screen spaced a predetermined distance from the light source a filament image so largely slanted as to incur an indentation, and thus they have special reflecting characteristics different from those of the main reflecting area 40 as will be described later.

The sub reflecting areas 42A and 42B of the reflector 30 according to the present invention are not any geometrical curved surfaces like an ellipsoid or paraboloid but they are formed by the multiple fine reflecting surface elements formed by the methods described in the Applicant's U.S. Pat. No. 4,825,343 (issued on Apr. 25, 1989, the subject matter of which is incorporated herein by reference, and which are smoothly joined to one another and have different orientations. Further description will be made below with reference to FIGS. 9 to 11.

Figure 9:
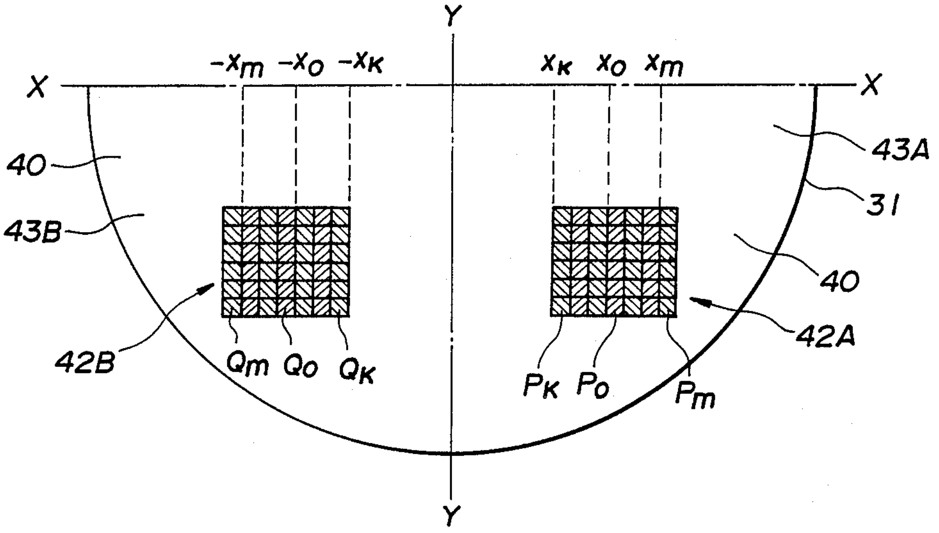

FIG. 9 is a schematic diagram, as enlarged in scale, of the lower half of the inner reflecting surface 31 of the reflector 30. The sub reflecting areas 42A and 42B are formed by multiple fine reflecting surface element groups Pk, . . . , Po, . . . , Pm and Qk, . . . , Qo, . . . , Qm extending longitudinally, respectively (only 7 groups of fine reflective surface elements are shown for the simplicity of illustration). Each group of fine reflecting surface elements consists of multiple fine reflecting surface elements (only 6 fine reflecting surface elements are shown for the simplicity of illustration). The fine reflecting surface element group Po forming the sub reflecting area 42A is located at the intermediate position between the fine reflecting surface element group Pk (of which the x coordinate is Xo) nearest to the vertical plane in which the optical axis lies and the fine reflecting surface element group Pm (of which the x coordinate is Xm) farthest from the vertical plane in which the optical axis lies, and the orientations of the fine reflecting surface elements belonging to the group Po are so determined that rays of light incident upon them from the light source are converge upon the center C of the cut-off edge 35 on the optical axis as shown in FIG. 10.

Also the orientations of the fine reflecting surface eelements belonging to the group Pk nearest to the vertical plane in which the optical axis lies are so determined that the rays of light incident upon them travel crossing the optical axis and converge upon a point Sk on the cut-off edge 35 which is 18 to 20 mm away from the center C of the cut-off edge 35 after crossing the optical axis. Furthermore, the orientations of the fine reflecting surface elements belonging to the fine reflecting surface element groups, respectively, lying between the groups Po and Pk are so determined that the rays of light incident upon them from the light source travel crossing the optical axis and converge upon the points lying between the center C and the point SK of the cut-off edge 35. Namely, the orientations of the fine reflecting surface elements belonging to the groups lying between the groups Po and Pk and nearer to the optical axis are so determined that the incident rays of light from the light source travel crossing the optical axis and converge upon the points farther from the optical axis.

The orientations of the fine reflecting surface elements belonging to the group Pm farthest from the vertical plane in which the optical axis lies are so determined that the rays of light incident upon them converge upon the point Sm on the cut-off edge 35 which is 28 to 30 mm away from the center C of the cut-off edge 35. Further, the orientations of the fine reflecting surface elements belonging to the fine reflecting surface element groups, respectively, lying between the groups Po and Pm are so determined that the incident rays of light from the light source converge upon the points, respectively, on the cut-off edge 35, lying between the center C and the point Sm of the cut-off edge 35. Namely, the orientations of the fine reflecting surface elements belonging to the groups lying between the groups Po and Pm and farther from the optical axis are so determined that the incident rays of light from the light source converge upon the points farther from the optical axis.

Figure 10:
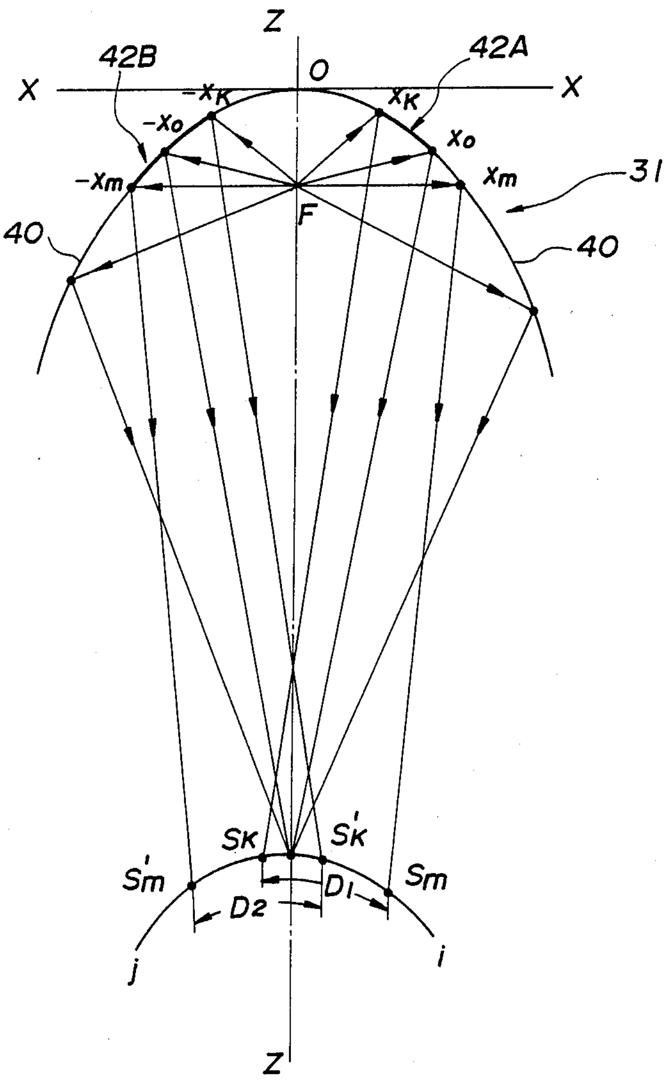
Figure 11A:
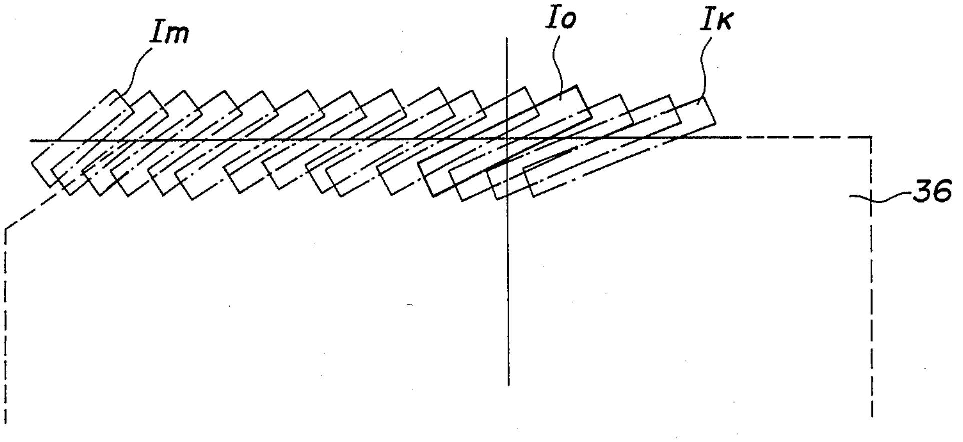
Figure 11B:
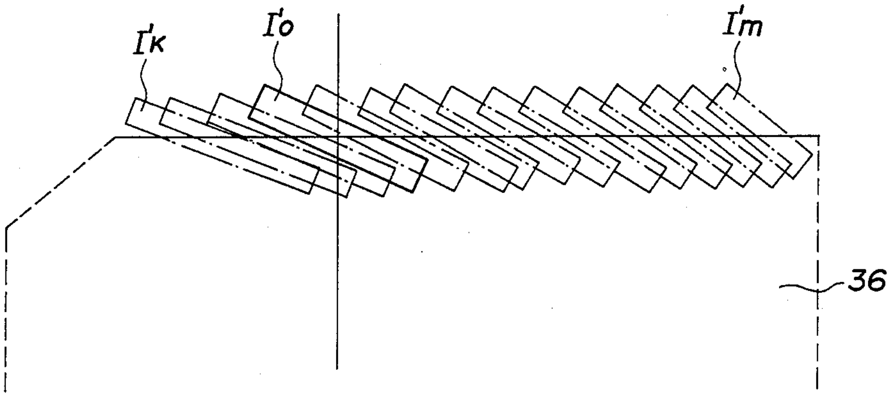

According to this embodiment, the area D1 upon which the rays of light reflected from the sub reflecting area 42A are converged is a linear zone defined by the points Sk and Sm on the cut-off edge 35 and in which the center C of the cut-off edge 35 as shown in FIG. 10, that is, the second focus of the spheroid forming the main reflecting area 40. FIG. 11 (A) schematically shows the filament image formed at the position of the shade by the sub reflecting area 42A, the filament images formed by the fine reflecting surface elements Po, Pk and Pm being indicated with Io, Ik and Im. It will be obvious from FIG. 11 (A) that the filament images formed at the position of the shade by the fine reflecting surface element groups lying between the groups Po and Pk and those lying between the groups Po and Pm are located at respective positions shifted horizontally from the optical axis (the shifted positions are indicated with dot-dash lines) and that the shifting range falls on the horizontal positions of 18 to 20 deg. and of 28 to 30 deg., respectively, as viewed from the center of the filament.

The above are also true for the fine reflecting surface element groups Qo, . . . , Qk, . . . , Qm (of which the x coordinates are −Xo, . . . , −Xk, . . . , −Xm, respectively) forming the sub reflecting area 42B located symmetrical to the sub reflecting area 42 with respect to the vertical plane in which the optical axis lies. Namely, the orientations of the fine reflecting surface elements belonging to the group Qo are so determined that the rays of light incident upon them from the light source converge upon the center C of the cut-off edge 35; the orientations of the fine reflecting surface elements belonging to the group Qk are so determined that the rays of light incident upon them from the light source travel crossing the optical axis and converge upon the point Sk' (located symmetrically to the point Sk) on the cut-off edge 25 which is 18 to 20 mm away from the center C of the cut-off edge 35; the orientations of the fine reflecting surface elements belonging to the group Qm are so determined that the rays of light incident upon them from the light source converge upon the point Sm' (located symmetrically to the point Sm) on the cut-off edge 35 which is 28 to 30 mm away from the center C of the cut-off edge 35; the orientations of the fine reflecting surface elements belonging to the groups, respectively, lying between the groups Qo and Qk are so determined that the rays of light incident upon them from the light source travel crossing the optical axis and are converged upon the points, respectively, on the cut-off edge 35 which lie between the center C and the point Sk' of the cut-off edge 35; and the orientations of the fine reflecting surface elements belonging to the groups, respectively, lying between the groups Qo and Qm are so determined that the rays of light incident upon them from the light source are converged upon the points, respectively, lying between the center C and the point Sm' of the cut-off edge 35.

According to the present invention, the area D2 upon which the rays of light reflected from the sub reflecting area 42B are converged is a linear zone defined by the points Sk' and Sm' on the cut-off edge 35 and in which the center C of the cut-off edge 35 as shown in FIG. 10, that is, the second focus of the spheroid forming the main reflecting area 40. FIG. 11 (B) schematically shows the filament image formed at the position of the shade by the sub reflecting area 42B, the filament images formed by the fine reflecting surface elements Qo, Qk and Qm being indicated with Io', Ik' and Im'. It will be obvious from FIG. 11 (B) that the filament images formed at the position of the shade by the fine reflecting surface element groups lying between the groups Qo and Qk and those lying between the groups Qo and Qm are located at respective positions shifted horizontally from the optical axis (the shifted positions are indicated with dot-dash lines) and that the shifting range falls on the horizontal positions of 18 to 20 deg. and of 28 to 30 deg., respectively, as viewed from the center of the filament.

Figure 12:
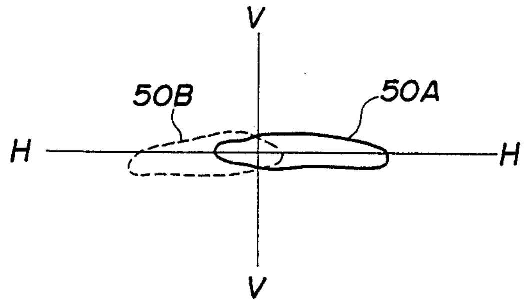
Figure 13:
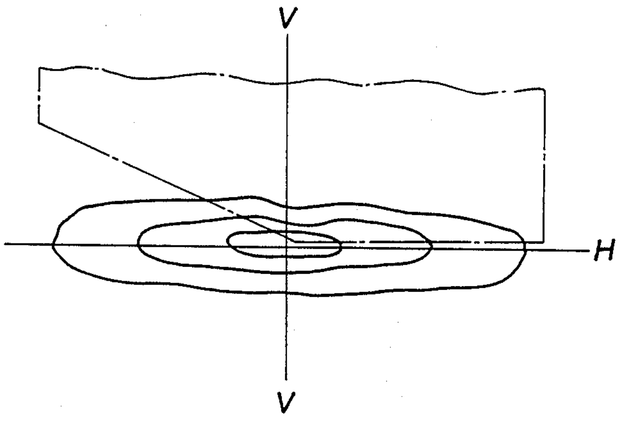

The light-converged areas D1 and D2 of the sub reflecting areas 42A and 42B, respectively, are linear zones, respectively, in which the second focus of the spheroid forming the main reflecting area 40, namely, the center C of the cut-off edge, lies. It will be thus understood that the filament images overlap one another at the position near the center C of the cut-off edge and are shifted rightward and leftward, respectively. FIG. 12 schematically show the light distribution pattern of the filament images in the light-converged areas D1 and D2 projected on a screen located before the convex lens 34 and FIG. 13 schematically shows the isolux curve of the light distribution pattern of the filament images formed by the main reflecting area 40 and sub reflecting ares 42A and 42B and projected on the screen. The filament images overlapping one another at the positions near the center C of the cut-off edge contribute along with the filament images formed at the center C of the cut-off edge by the main reflecting area, to the increase of the illuminance at the center of the projected light distribution pattern and the horizontally, namely, right-left shifted filament images contribute to the production of a horizontally elongated projected pattern without any indention Therefore, the head lamp according to the present invention can form an ideal projected light distribution. pattern of which the contour line on the side nearest the vehicle is generally flat within a range in which the illuminance at the center of the pattern is not reduced. The sub reflecting areas 42A and 42B are formed as square reflecting areas, respectively, in the first and second reflecting areas 43A and 43B symmetrical to each other with respect to the vertical plane in which the optical axis lies because this is rather convenient for calculation of the orientations of the fine reflecting surface elements in the NC (numerical controlled) machining of the fine reflecting surface elements. However, the shapes of the reflecting areas are not limited to the square ones but it is possible to change, taking into consideration the luminous intensity distribution of the entire intended projected light distribution pattern and within a range in which the illuminance at the center of the projected light distribution pattern, the areas and shapes of the sub reflecting areas depending upon the specific reflecting areas of a spheroidal reflecting surface that produce large slanted filament images.

Figure 14:
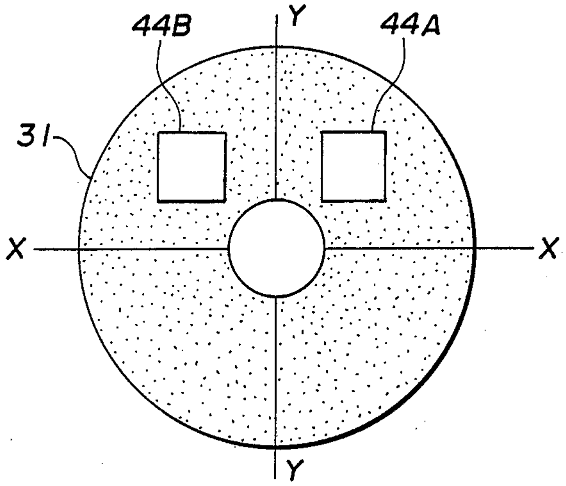
FIG. 14 is a schematic front view of a variant of reflector in which two sub reflecting areas having special reflecting characteristics are formed in parts of the spheroidal reflecting surface located above the optical axis.

FIG. 14 shows a variant of the above-mentioned embodiment according to which the sub reflecting ares are, formed as square reflecting areas 44A and 44B, respectively, located in two reflecting areas above the horizontal plane in which the optical axis lies and which are symmetrical to each other with respect to the vertical plane in which the optical axis lies. The sub reflecting areas 44A and 44B are formed in such positions as to produce largely slanted filament images and correspond to the predetermined reflecting areas located above the horizontal plane in which the optical axis of the spheroidal reflecting surface lies, and also so that they have similar reflecting characteristics to those of the sub reflecting areas 42A and 42B. In this case, the light distribution patterns of the filament images formed on the cut-off edge by the sub reflecting areas 44A and 44B are ones derived from inversion of the light distribution patterns of the filament images formed on the cut-off edge by the sub reflecting areas 42A and 42B, respectively, with respect to the vertical plane in which the optical axis lies, and they generally correspond to those shown in FIGS. 11 (B) and (A), respectively. Also in this variant, the sub reflecting areas 44A and 44B are similarly effective to the sub reflecting areas 42A and 42B.

Figure 15:
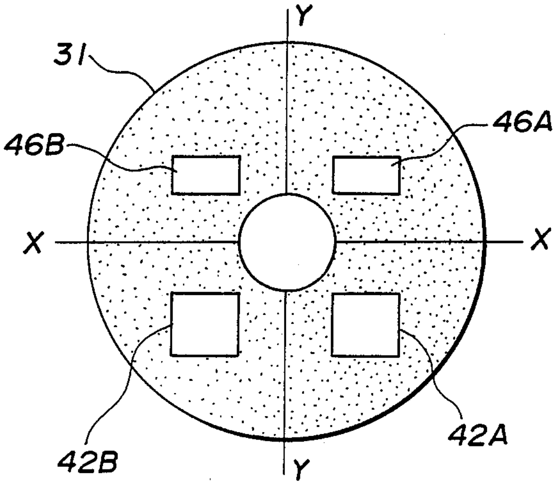
FIG. 15 is also a schematic front view of another variant of reflector in which two sub reflecting areas having special reflecting characteristics are formed in parts of the spheroidal reflecting surface located below the optical axis and two other sub reflecting areas having special reflecting characteristics are formed in other parts of the spheroidal reflecting surface located above the optical axis.

FIG. 15 is another variant of the present invention, according to which, in addition to the sub reflecting areas 42A and 42B located below the horizontal plane in which the optical axis lies, sub reflecting areas 46A and 46B are formed which are located above the horizontal plane in which the optical axis lies. The positions of these sub reflecting areas 46A and 46B generally correspond to the positions of the sub reflecting areas 44A and 44B, respectively, into the above-mentioned first variant, but the areas of them are set smaller than the sub reflecting areas 44A and 44B, taking into consideration the luminous intensity distribution of the intended entire projected light distribution pattern. The reflecting characteristics of the sub reflecting areas 46A and 46B are similar to those of the sub reflecting areas 42A and 42B. The sub reflecting areas 42A and 46A are so designed as to converge the rays of light incident upon the fine reflecting surface elements from the light source upon the area D1 shown in FIG. 10, while the sub reflecting areas 42B and 46B are so designed as to converge the rays of light upon the fine reflecting surface elements from the light source upon the area D2. According to this second variant, the main reflecting area 40 has a smaller area than in the aforementioned embodiment and the sub reflecting areas 46A and 46B will be correspondingly larger so that the illuminance at the center of the projected light distribution pattern will be somewhat lower, but a projected light distribution pattern can be provided which is relatively small in difference of illuminance between the center and right and left peripheries thereof.

In the embodiment and variants having been described in the foregoing, the fine reflecting surface areas are formed each in a size of 0.2×0.2 mm. Among the fine reflecting surface element groups forming the sub reflecting areas, the groups Po and Qo which form filament images at the center C of the cut-off edge 35 of the shade 36 are disposed at the central portion of the respective sub reflecting areas, but they may be disposed within elongated reflecting areas located somewhere in the sub reflecting areas. Also, though the orientations of the fine reflecting surface elements are so determined that the rays of light incident from the light source upon the fine reflecting surface elements forming the sub reflecting areas converge upon the points within the light-converged areas D1 and D2 lying along the cut-off edge, the rays of light may not always converge upon the cut-off edge but it suffices to converge the rays of light upon a finite horizontal area within a reach of a few millimeters from the cut-off edge. Further, though the orientations of the multiple fine reflecting surface elements belonging to a same group are so determined that the rays of light incident upon the fine reflecting surface elements converge upon a same point within the light-converged area, the present invention is not limited to this arrangement but the rays of light may be converge upon different points within finite vertical areas within a few millimeters vertically about a certain point within the light-converged area. Therefore, the light-converged areas D1 and D2 are defined as ones containing such finite horizontal and vertical areas and in which the optical axis substantially lies.

In the embodiment and variants having been described in the foregoing, the main reflecting area has been illustrated and explained as one spheroidal reflecting surface, but the present invention is not limited to this arrangement and the main reflecting area may be formed as a spheroidal reflecting surface in the central area, for example, in which the optical axis of the inner reflecting surface lies and as a spheroidal reflecting surface in the peripheral area near the front opening of the reflector, namely, as reflecting surfaces different in reflecting characteristics from each other.

As having been described in the foregoing, since at least parts of a spheroidal reflecting surface which form many greatly slanted filament images are specially designed to have reflecting areas having such reflecting characteristics as to shift those many filament images horizontally on the screen, the reflector of the head lamp according to the present invention can solve the problems of the conventional head lamp reflectors in which a spheroid is used as parts of the inner reflecting surface, namely, the problems that the lower central portion of the profile of the illumination pattern on the traffic road is indented so that it is dark and that the illumination on the right and left sides of the road is not practically satisfactory.

What is claimed is:

1. A projector-type head lamp for vehicles, comprising a reflector having an optical axis, a lamp bulb operable as a light source, having a filament horizontally disposed in a direction perpendicular to said optical axis, a shade having an optically effective cut-off edge which blocks a part of the rays of light emitted from said light source and reflected at said reflector to shape a bright-dark boundary, and a convex lens disposed in an area defined by the light beam shaped by said shade and having a focus near the upper center of the cut-off edge of said shade, the inner reflecting surface of said reflector having a main reflecting area including a part of a spheroid having a first focus near the center of said filament and a second focus near the center of said cut-off edge, at least parts of said main reflecting area being located above or below the horizontal plane in which said optical axis lies and which define multiple largely slanted filament images on the screen being formed as sub reflecting areas having such reflecting characteristics as to shift said filament images horizontally.

2. A projector-type head lamp for vehicles, comprising a reflector having an optical axis, a lamp bulb operable as a light source, having a filament horizontally disposed in a direction perpendicular to said optical axis, a shade having an optically effective cut-off edge which blocks a part of the rays of light emitted from said light source and reflected at said reflector to shape a bright-dark boundary, and a convex lens disposed in an area defined by the light beam shaped by said shade and having a focus near the upper center of the cut-off edge of said shade, the inner reflecting surface of said reflector comprising a main reflecting area including a part of a spheroid having a first focus near the center of said filament and a second focus near the center of said cut-off edge; and at least a pair of sub reflecting areas formed in two finite reflecting areas located above or below the horizontal plane in which said optical axis lies and which are symmetrical to each other with respect to the vertical plane in which said optical axis lies;

said sub reflecting areas being formed by multiple fine reflecting surface elements contiguously and smoothly joined to one another, the orientations of the fine reflecting surface elements belonging to one of said sub reflecting areas located in one of said finite reflecting areas being so determined that the incident rays of light from said light source converge upon a first light-converged area lying along the cut-off edge of said shade, while the orientations of the fine reflecting surface elements belonging to the other of said sub reflecting areas in the other of said finite reflecting areas are so determined that the incident rays of light from said light source converge upon a second light-converged area lying along the cut-off edge of said shade.

3. A projector-type head lamp for vehicles according to claim 2, wherein said first and second light-converged areas substantially lie in the horizontal plane in which said optical axis lies and said first and second light-converged areas overlap each other in an area in which the intersection of said optical axis and said cut-off edge lies.

4. A projector-type head lamp for vehicles according to claim 3, wherein said two sub reflecting areas are formed by multiple elongated fine reflecting surface element groups lying along multiple curves intersecting multiple planes parallel to the vertical plane in which said optical axis lies and the orientations of the fine reflecting surface elements belonging to a same fine reflecting surface element group among said multiple groups are so determined that the incident rays of light from said light source converged upon a same finite reflecting area in said first or second light-converged area.

5. A projector-type head lamp for vehicles according to claim 4, wherein the orientations of the fine reflecting surface elements belonging to said same fine reflecting surface element group are so determined that the incident rays of light from said light source converge upon a same point in said first or second light-converged area.

6. A projector-type head lamp for vehicles according to claim 4, wherein the multiple elongated fine reflecting surface element groups forming each of said sub reflecting areas consist of an inner reflecting area located nearer to the vertical plane in which said optical axis lies and are formed by the fine reflecting surface elements of which the orientations are so determined that the incident rays of light from said light source are converged crossing said optical axis, an intermediate reflecting area adjoining said inner reflecting area and formed by the fine reflecting surface elements of which the orientations are so determined that the incident rays of light from said light source converge upon the intersection between said optical axis and said cut-off edge, and an outer reflecting area adjoining said intermediate reflecting area and formed by the fine reflecting surface elements of which the orientations are so determined that the incident rays of light from said light source are converged upon a light-converged area lying opposite to another light-converged area formed by said inner reflecting area with respect to said intersection.

7. A projector-type head lamp for vehicles, comprising a reflector having an optical axis, a lamp bulb operable as a light source, having a filament horizontally disposed in a direction perpendicular to said optical axis, and a convex lens disposed in an area defined by the light beam shaped by the rays of light reflected by said reflector and having an optical axis nearly coincident with the optical axis of said reflector;

the inner reflecting surface of said reflector comprising a main reflecting area including a part of a spheroid having a first focus near the center of said filament and a second focus near the center of said cut-off edge; and at least a pair of sub reflecting areas formed in two finite reflecting areas located above or below the horizontal plane in which said optical axis lies and which are symmetrical to each other with respect to the vertical plane in which said optical axis lies;

said sub reflecting areas being formed of multiple fine reflecting surface elements contiguously and smoothly joined to one another, the orientations of the fine reflecting surface elements belonging to one of said sub reflecting areas located in one of said finite reflecting areas being so determined that the incident rays of light from said light source converge upon a first horizontal light-converged area lying in a substantial horizontal plane in which said second focus lies, while the orientations of the fine reflecting surface elements belonging to the other of said sub reflecting areas in the other of said finite reflecting areas are so determined that the incident rays of light from said light source converge upon a second light-converged area lying in said horizontal plane; said first and second horizontal light-converged areas overlapping each other in the finite area in which said second focus lies.

* * * * *